US010829697B2

(12) United States Patent
Brandvold et al.

(10) Patent No.: US 10,829,697 B2
(45) Date of Patent: Nov. 10, 2020

(54) PROCESSES FOR PRODUCING A FUEL FROM A RENEWABLE FEEDSTOCK

(71) Applicant: UOP LLC, Des Plaines, IL (US)

(72) Inventors: Timothy A. Brandvold, Arlington Heights, IL (US); Daniel L. Ellig, Arlington Heights, IL (US); James M. Andersen, Elmhurst, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/217,936

(22) Filed: Jul. 22, 2016

(65) Prior Publication Data
US 2017/0029722 A1 Feb. 2, 2017

Related U.S. Application Data

(60) Provisional application No. 62/197,238, filed on Jul. 27, 2015.

(51) Int. Cl.
C10G 3/00 (2006.01)
C10G 57/00 (2006.01)
C10L 1/08 (2006.01)

(52) U.S. Cl.
CPC ............... C10G 3/42 (2013.01); C10G 57/00 (2013.01); C10L 1/08 (2013.01); C10G 2300/1011 (2013.01); C10G 2300/202 (2013.01); C10G 2400/04 (2013.01); C10L 2200/0469 (2013.01); C10L 2270/026 (2013.01); C10L 2290/06 (2013.01); C10L 2290/12 (2013.01);
(Continued)

(58) Field of Classification Search
CPC ........ C10L 2290/547; B01D 61/14–22; C10G 31/09
See application file for complete search history.

(56) References Cited

U.S. PATENT DOCUMENTS 4,992,605 A * 2/1991 Craig ........................ C10L 1/04
44/389
5,885,444 A * 3/1999 Wansbrough ............ C10G 9/00
208/100

(Continued)

FOREIGN PATENT DOCUMENTS

WO    2009131510    10/2009

OTHER PUBLICATIONS

Gruschwitz et al., "Optimized backflushing process for fibrous media in engine oil filtration and enhancement by ultrasound", Chemical Engineering and Technology (2013), v 36, n 3, p. 467-473.

(Continued)

Primary Examiner — In Suk C Bullock
Assistant Examiner — Alyssa L Cepluch
(74) Attorney, Agent, or Firm — Paschall & Associates, LLC; James C. Paschall

(57) ABSTRACT

An apparatus and a process for providing a green diesel with improved flow properties. A renewable feed comprising an oil is deoxygenated to provide an effluent. The effluent may be isomerized to improve the qualities of the effluent for use as a diesel fuel. Additionally, the effluent may be filtered to increase the fuel flow properties. As filtration zone can be used, which includes a filter and which may be flushed with a portion of the feed stream to the filtration zone or a portion of filtration zone effluent. The wash stream may be heated.

17 Claims, 1 Drawing Sheet

(52) U.S. Cl.
CPC ..... *C10L 2290/24* (2013.01); *C10L 2290/545* (2013.01); *C10L 2290/547* (2013.01); *Y02E 50/13* (2013.01); *Y02P 30/20* (2015.11)

(56) References Cited

U.S. PATENT DOCUMENTS

| | | | | |
|---|---|---|---|---|
| 7,838,272 | B2* | 11/2010 | Miller | C10G 45/58 |
| | | | | 435/167 |
| 8,119,847 | B2* | 2/2012 | Dindi | B01J 23/755 |
| | | | | 585/240 |
| 8,246,814 | B2* | 8/2012 | Koseoglu | C10G 25/05 |
| | | | | 208/250 |
| 8,715,486 | B2 | 5/2014 | Myllyoja et al. | |
| 9,023,196 | B2 | 5/2015 | Cooper et al. | |
| 2007/0161832 | A1* | 7/2007 | Myllyoja | C10M 105/04 |
| | | | | 585/7 |
| 2008/0092435 | A1* | 4/2008 | Bzdek | B01D 17/085 |
| | | | | 44/301 |
| 2011/0070602 | A1 | 3/2011 | Thomson et al. | |
| 2012/0090223 | A1* | 4/2012 | Kokayeff | C10G 45/60 |
| | | | | 44/308 |
| 2012/0251424 | A1 | 10/2012 | Havlik et al. | |
| 2016/0145659 | A1* | 5/2016 | Anderson | B01D 61/025 |
| | | | | 435/3 |

OTHER PUBLICATIONS

Qaisrani et al., "Impact of gas bubbling and backflushing on fouling control and membrane cleaning", Desalination (2011), v 266, n 1-3, p. 154-161.

"23rd American Filtration and Separations Society Annual National Conference and Exposition 2010" vol. 2.

Laska et al., "Robust scale-up of dead end filtration: Impact of filter fouling mechanisms and flow distribution" Biotechnology and Bioengineering (2005), v 92, n 3, p. 308-320.

* cited by examiner

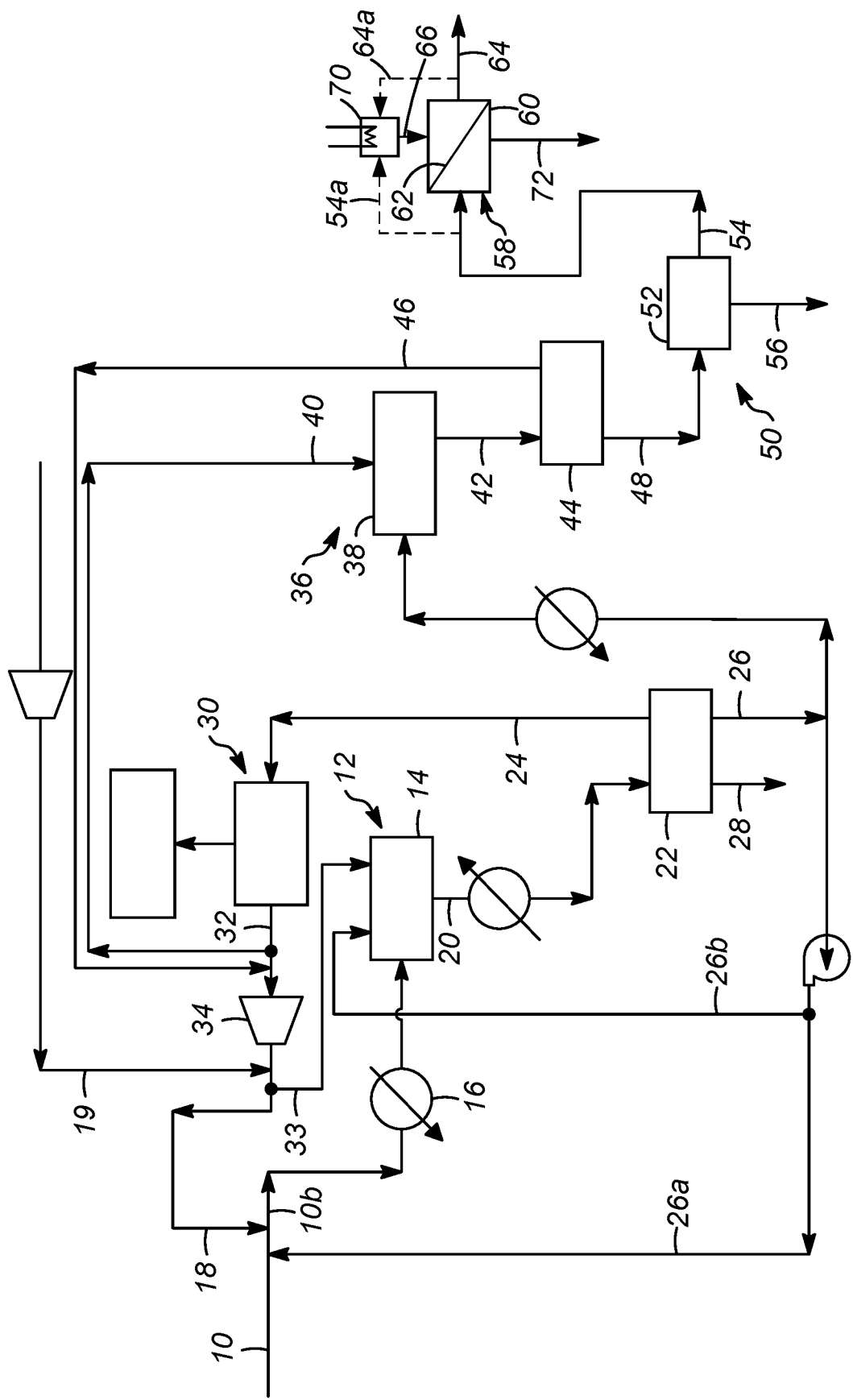

PROCESSES FOR PRODUCING A FUEL FROM A RENEWABLE FEEDSTOCK

CROSS-REFERENCE TO RELATED APPLICATION

This application claims priority from Provisional Application No. 62/197,238 filed Jul. 27, 2015, the contents of which are hereby incorporated by reference.

FIELD OF THE INVENTION

This invention relates generally to and apparatus and a process for the conversion of oils from a renewable feedstock to diesel fuel and more particularly to improving the fuel flow properties of a diesel fuel produced from a renewable feedstock.

BACKGROUND OF THE INVENTION

The use of biofuels is becoming more and more popular around the world especially based upon concerns from limited petroleum resources, increasing energy demand, greenhouse gas emissions and related climate change concerns. In addition to producing petroleum derived fuels, the fuels can also be manufactured using carbon and hydrogen derived from organic biomass, such as vegetable oils, organic fats, and organic greases.

For example, biological oils and fats can be converted into diesel, naphtha and jet fuels using many different processes, such as hydro-deoxygenation and hydro-isomerization processes. Diesel fuel refers to a mixture of carbon chains that generally contain between 8 and 21 carbon atoms per molecule. Typically, diesel has a boiling point in the range of 180 to 380° C. (356 to 716° F.). The production of diesel fuel can be either petroleum-derived or biologically-sourced. Petroleum-derived diesel is produced from the fractional distillation of crude oil, refining products, or by conversion processes. On the other hand, biologically-sourced diesel fuel is derived from renewable feedstock, such as vegetable oils or animal fats.

The biologically-sourced diesel fuel is desirable for a variety of reasons. In addition to the ecological benefits of using biologically-sourced diesel fuel, there exists a market demand for such fuel. For diesel purchasers, the use of biologically-sourced diesel fuel can be promoted in public relations. Also, certain governmental policies may require or reward use of biologically-sourced fuels. Finally, fluctuation of crude oil prices is also a reason refiners may choose to produce biologically-sourced fuels. The biologically-sourced diesel fuel is usually classified into two categories, biodiesel and green diesel.

Biodiesel (also referred to as fatty acid methyl ester, or FAME) mainly consists of long-chain alkyl esters typically mono-alkyl ester products derived from a lipid feedstock. The chemical structure of biodiesel is distinctly different from petroleum-derived diesel, and therefore biodiesel has somewhat different physical and chemical properties from petroleum-derived diesel. For example, biodiesel has a much higher oxygen content than petroleum-derived diesel.

Green diesel (also referred to as renewable hydrocarbon diesel, hydroprocessed vegetable oils or HVO), on the other hand, is substantially the same chemically as petroleum-derived diesel, but green diesel is made from recently living biomass. Unlike biodiesel, which is an ester and has different chemical properties from petroleum diesel, green diesel is composed of long-chain hydrocarbons, and can be mixed with petroleum diesel in any proportion for use as transportation fuel. Green diesel resembles petroleum-derived diesel fuel and usually has a very low heteroatom (nitrogen, oxygen, sulfur) content. Green diesel can thus be produced to be indistinguishable from petroleum diesel. This is beneficial because no changes to fuel infrastructure or vehicle technology are required for green diesel and it may be blended in any proportion with petroleum-derived diesel fuel as it is stable, not oxygenated. Further, unlike FAME biodiesel technology which produces glycerin as a by-product, the production of green diesel generates valuable co-products like naphtha, liquefied petroleum gas components like propane and butane, and fuel gases like methane and ethane.

However, use as diesel fuel not only requires acceptable hydrocarbon length and boiling point, but also acceptable qualities or characteristics, such as cetane number, density, lubricity, cold-flow properties cold filter plugging point, and sulfur content to name a few.

Accordingly, there remains a constant desire to provide processes which provide green diesel from a renewable feedstock. It is further desirable to provide such processes which provide green diesel that meets or exceeds the qualities or characteristics of petroleum diesel.

SUMMARY OF THE INVENTION

One or more processes for the producing a diesel from a renewable resource have been invented in which the bio-based diesel is filtered to improve a fuel flow property.

Therefore, the present invention may be characterized broadly as providing a process for improving a fuel flow property of bio based diesel fuel by: converting a biorenewable feedstock in a reaction zone having a catalyst and being operated under conditions to provide a hydrocarbon effluent; isomerizing the hydrocarbon effluent in an isomerization zone having an isomerization zone being operated at conditions to provide an isomerization effluent; filtering one or more contaminants from the isomerization effluent in a filtration zone having a filter with pores configured to remove at least 70% of particles with an average particle size between about 0.1 to 5 micrometers to provide a filtered effluent; and, separating at least a diesel range fuel stream from the filtered effluent.

It is contemplated that the filter removes at least 75% of the particles with an average particle size between about 0.1 to 5 micrometers.

The process may also include flushing the filter of the filtration zone with a wash stream, the wash stream having a temperature that is higher than a temperature of the filter. The wash stream may comprise the isomerization effluent. The wash stream may comprise the filtered effluent.

It is contemplated that the filtration zone comprises two vessels, each vessel including a filter configured to remove at least 70% of particles with an average particle size between about 0.1 to 5 micrometers. The two vessels may be arranged in a lead-lag configuration.

The present invention may also be broadly characterized as providing a process for improving a fuel flow property of bio based diesel fuel by: passing a biorenewable feedstock to a reaction zone having a catalyst and being operated under conditions to provide a hydrocarbon effluent; passing at least a portion of the hydrocarbon effluent to a filtration zone having a filter configured to remove at least 70% of particles with an average particle size between about 0.1 to 5 micrometers to provide a filtered effluent; and, passing a wash stream into the filtration zone to regenerate the filter; and, passing the filtered effluent to a product separation zone configured to separate the components of the filtered effluent into at least a diesel range fuel stream.

The process may include passing the hydrocarbon effluent into an isomerization zone having an isomerization zone being operated at conditions to provide an isomerization effluent and, passing at least a portion of the isomerization effluent to the filtration zone. The wash stream may comprise the isomerization effluent. The wash stream may comprise the filtered effluent. The wash stream may comprise a portion of the hydrocarbon effluent.

The process may include recycling at least a portion of a spent wash stream to the filtration zone with the portion of the hydrocarbon effluent.

The process may include heating the wash stream to provide a heated wash stream and, passing the heated wash stream to the filtration zone to regenerate the filter.

The process may include blending the diesel range fuel stream with a petroleum derived diesel range fuel stream.

The pores of the filter may is configured to remove at least 75% of particles with an average particle size between about 0.1 to 5 micrometers.

The filtration zone may be configured to remove at least one hydrocarbon based contaminant.

The present invention may be further characterized as providing an apparatus for producing a bio based diesel fuel having: a deoxygenation zone having a catalyst and being operated under conditions to provide a hydrocarbon effluent; a filtration zone having a filter configured to remove at least 70% of particles with an average particle size between about 0.1 to 5 micrometers to provide a filtered effluent, the filtration zone in communication with the reaction zone; a wash line in communication with the filtration zone configured to supply wash stream to regenerate the filter; and, a product separation zone in communication with the filtration zone configured to separate the components of the filtered effluent into at least a diesel range fuel stream.

The process may include an isomerization zone having an isomerization zone being operated at conditions to provide an isomerization effluent, the isomerization zone disposed between the deoxygenation zone and the filtration zone.

The process may include a heater configured to heat the wash stream to provide a heated wash stream to the filtration zone.

Additional aspects, embodiments, and details of the invention, all of which may be combinable in any manner, are set forth in the following detailed description of the invention.

BRIEF DESCRIPTION OF THE DRAWING

One or more exemplary embodiments of the present invention will be described below in conjunction with the following drawing figure, in which:

The FIGURE shows a process flow diagram according to one or more aspects of the present invention.

DETAILED DESCRIPTION OF THE INVENTION

As mentioned above, processes for improving the flow properties of a diesel fuel and apparatuses for practicing same have been invented. The present invention provides one or more processes for producing a transportation fuel, such as diesel fuel, from renewable sources. These renewable sources include, but are not limited to, plant oils such as corn, rapeseed, canola, soybean and algal oils, animal fats such as tallow, fish oils and various waste streams such as yellow and brown greases, dairy sludge, used or recycled cooking oil, by-products from edible oil refining such as palm stearin or palm fatty acid distillate or recovered oils from spent bleaching earth, and sewage sludge.

The common feature of these sources is that they are composed of glycerides and Free Fatty Acids (FFA). Both of these classes of compounds contain aliphatic carbon chains having from 8 to 24 carbon atoms. The aliphatic carbon chains in the glycerides or FFAs can be saturated or mono-, di- or poly-unsaturated. The term renewable feedstock is meant to include feedstocks other than those derived from petroleum crude oil. The renewable feedstocks that can be used in the present invention include any of those which comprise glycerides and FFAs. Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, *jatropha* oil, fats in milk, fish oil, algal oil, sewage sludge, and the like. Additional examples of renewable feedstocks include non-edible vegetable oils from the group comprising *Jatropha curcas* (Ratanjoy, Wild Castor, Jangli Erandi), *Madhuca indica* (Mohuwa), *Pongamia pinnata* (Karanji Honge), and *Azadiracta indicia* (Neem). The glycerides and FFAs of the typical vegetable or animal fat contain aliphatic hydrocarbon chains in their structure which have 8 to 24 carbon atoms with a majority of the fats and oils containing high concentrations of fatty acids with 16 and 18 carbon atoms.

Triglycerides are formed by three, typically different, fatty acid molecules that are bonded together with a glycerol bridge. The glycerol molecule includes three hydroxyl groups (HO—), and each fatty acid molecule has a carboxyl group (COOH)—which shares an oxygen atom with the corresponding hydroxyl group. In triglycerides, the hydroxyl groups of the glycerol join the carboxyl groups of the fatty acids to form ester bonds. Therefore, during deoxygenation, the fatty acids are freed from the triglyceride structure and are converted into linear paraffins. The glycerol is converted into propane, and the oxygen in the hydroxyl and carboxyl groups is converted into either water or carbon dioxide. Deoxygenation can occur via two major pathways, where the oxygen atoms of the triglyceride either combine with available hydrogen to form water ($H_2O$), known as hydrodeoxygenation, or retain their linkage to the first carbon of the fatty chain and convert to carbon dioxide ($CO_2$) or carbon monoxide (CO), known as decarboxylation and decarbonylation, respectively. Hydrodeoxygenation and decarboxylation/decarbonylation occur simultaneously and both result in the fatty acids breaking their links to the three-carbon backbone of the triglyceride, such that water, carbon oxides, and propane are evolved. With CO, $CO_2$, $H_2O$, and $H_2$ simultaneously present, the Water-Gas shift reaction will shift $CO_2$ and $H_2$ into CO and $H_2O$, or vice versa, depending on the catalyst selection and reaction conditions. Once deoxygenated and saturated, the fatty acid chains of the original triglyceride have been converted to long linear paraffin chains (normal alkanes) that are fully hydrocarbon. While these reactions produce a paraffinic hydrocarbon, in order to be acceptable for use as diesel fuel, the produced hydrocarbons may be converted and further processed to improve the fuel flow properties of the diesel.

With these general principles in mind, one or more embodiments of the present invention will be described with the understanding that the following description is not intended to be limiting.

As shown in FIG. 1, a renewable feedstock 10 is passed to a first reaction zone 12 comprising one or more catalyst beds in one or more reactors 14. The term "feedstock" is meant to include feedstocks that have not been treated to remove contaminants as well as those feedstocks purified in a pretreatment zone (not shown). The feedstock 10 is preferably heated, for example in a heat exchanger 16, prior to entering the reactor 14. Additionally, the feedstock 10 may be combined with a recycle stream 10a (discussed below) to form a combined feedstock 10b.

In addition to the feedstock 10, a gaseous stream 18 is also passed to the reactor 14 of the first reaction zone 12. The gaseous stream 18 comprises hydrogen and may also include other gases, such as carbon monoxide, carbon dioxide, hydrogen sulfide, ammonia, or water for example. The gaseous stream 18 may comprise one or more recycle gas streams (discussed below) as well as a makeup stream 19.

In the reaction first zone 12, the feedstock 10 is contacted with a hydrogenation or hydrotreating catalyst in the presence of hydrogen at hydrogenation conditions to hydrogenate the olefinic or unsaturated portions of the n-paraffinic chains and deoxygenate the oxygenated hydrocarbons. Hydrogenation conditions include a temperature of 100 to 500° C. (212 to 932° F.) and a pressure of 689 kPa absolute (100 psia) to 13,790 kPa absolute (2,000 psia). In another embodiment the hydrogenation conditions include a temperature of 200 to 371° C. (392 to 700° F.) and a pressure of 1,379 kPa absolute (200 psia) to 5,516 kPa absolute (800 psia). Other operating conditions for the hydrogenation zone are well known in the art.

Hydrogenation or hydrotreating catalysts are any of those well known in the art such as nickel, nickel/molybdenum, cobalt/molybdenum dispersed on a high surface area support. Other hydrogenation or hydrotreating catalysts include one or more noble metal catalytic elements dispersed on a high surface area support. Non-limiting examples of noble metals include Pt and/or Pd dispersed on gamma-alumina. The catalysts may or may not be sulfide. In order to maintain the catalyst in a partially sulfided state, sulfur may be added to the feedstock 10 or may be introduced into the reactor 14 separately from the feedstock 10.

These hydrogenation or hydrotreating catalysts are also capable of catalyzing decarboxylation and/or deoxygenation of the feedstock to remove oxygen from the glycerides. Generally, decarboxylation and/or deoxygenation conditions include a relatively low pressure of 3447 kPa (500 psia) to 6895 kPa (1000 psia), a temperature of 200 to 400° C. (392 to 752° F.) and a liquid hourly space velocity of 0.5 to 10 hr$^{-1}$. In another embodiment the decarboxylation conditions include the same relatively low pressure of 3447 kPa (500 psia) to 6895 kPa (1000 psia), a temperature of 288 to 345° C. (550 to 653° F.) and a liquid hourly space velocity of 1 to 4 hr$^{-1}$.

Since hydrogenation is an exothermic reaction, as the feedstock 10 flows through the catalyst bed the temperature increases and decarboxylation and deoxygenation may begin to occur. Thus, it is envisioned and is within the scope of this invention that all the reactions occur simultaneously in one reactor or in one bed. Alternatively, the conditions can be controlled such that hydrogenation primarily occurs in one bed and decarboxylation and/or deoxygenation occurs in a second bed. Of course if only one bed is used, then hydrogenation occurs primarily at the front of the bed, while decarboxylation/deoxygenation occurs mainly in the middle and bottom of the bed. Finally, desired hydrogenation can be carried out in one reactor, while decarboxylation and/or deoxygenation can be carried out in a separate reactor.

Returning to FIG. 1, an effluent 20 from the first reaction zone 12, after being cooled, for example by exchanging heat in a heat exchanger, is introduced to a phase separation vessel 22. Hydrogen, carbon oxides, possibly hydrogen sulfide and $C_{3-}$ hydrocarbons are separated and removed in line 24 and liquid hydrocarbons are removed in line 26. Water may also be removed from the phase separation vessel 22 in a line 28. Alternatively, although not depicted as such, the water may be removed as a vapor in line 24.

Since the vapor in line 24 from the phase separation vessel 22 comprises hydrogen, as well as other gases like carbon monoxide and carbon dioxide, it is desirable to recover the hydrogen and recycle it to the reaction zone 12; however, it is preferred that the stream is scrubbed to remove one or more contaminants. The carbon dioxide in the vapor in line 24 can be removed from the hydrogen and carbon monoxide in a scrubbing zone 30. The scrubbing zone 30 may comprise any well-known systems in the art, such as reaction with a hot carbonate solution, pressure swing adsorption, absorption with an amine in processes, etc. If desired, essentially pure carbon dioxide can be recovered by regenerating the spent absorption media. Thus, the vapor in line 24 is passed through one or more scrubbing zones 30 to remove carbon dioxide and hydrogen sulfide and provide a scrubbed recycle gas 32. The scrubbed recycle gas 32 will comprise the $C_{3-}$ hydrocarbons, hydrogen, and carbon monoxide and may be compressed in a recycle gas compressor 34 and used as a recycle gas stream to form a portion of the gaseous stream 18. Additionally, a portion of the scrubbed recycle gas may be utilized to isomerize hydrocarbons (discussed below) and can be from a suction or discharge of the recycle gas compressor 34. Furthermore, it is contemplated that a portion of the scrubbed recycled gas is passed back to the reactor 14 in the reaction zone 12 as a quench fluid in line 33 to control the temperature in the reactor 14. p Returning to the phase separation vessel 22, the liquid hydrocarbons removed from the phase separation vessel 22 in line 26 will have poor cold flow properties because it comprises essentially normal paraffins. In order to improve the cold flow properties of the liquid hydrocarbon fraction 26, the liquid hydrocarbons in line 26 can be passed to an isomerization zone 36. However, a portion 26a of the liquid hydrocarbons 26 from the phase separation vessel 22 may be recycled to the reaction zone 12 as the recycle stream combined with the renewable feedstock 10 (discussed above). Additionally, a second portion 26b of the liquid hydrocarbons 26 from the phase separation vessel 22 may also be used as cool quench liquid between beds of one of the reaction zone 12 to further control the heat of reaction and provide quench liquid for emergencies. The quench stream 26b may be introduced to the inlet the reaction zone 12 and/or to any subsequent beds or reactors. One benefit of the hydrocarbon recycle is to control the temperature rise across the individual beds. Additionally, and alternatively, a stream of hydrogen containing gas may be used as a quench fluid to control the temperature in the reaction zone 12.

As will be appreciated, the isomerization zone 36 comprises one or more reactors 38 which contain an isomerization catalyst and which are operated under isomerization conditions to at least partially isomerize the normal paraffins to branched paraffins. Additionally, a hydrogen containing gas 40 is also passed to the isomerization zone 36, and as mentioned above, the hydrogen containing gas 40 may comprise a portion of the scrubbed recycle gas 32.

In the isomerization zone 36, only minimal branching of the hydrocarbons is required, enough to overcome cold-flow problems of the normal paraffins. Since attempting to do significant branching runs the risk of undesired cracking, the predominant isomerized product is a mono-branched hydrocarbon. An isomerized effluent 42 of the isomerization zone 36 comprises a branched-paraffin-rich stream. By the term "rich" it is meant that the isomerized effluent 42 has a greater concentration of branched paraffins than the hydrocarbons entering the isomerization zone 36, and preferably comprises greater than 50 mass-% branched paraffins. It is envisioned that the isomerized effluent 42 may comprise as much as 70, 80, or 90 mass-% branched paraffins.

The isomerization of the liquid hydrocarbons in line 26 can be accomplished in any manner known in the art or by using any suitable catalyst known in the art. One or more beds of catalyst may be used within the reactor(s) 38 in the isomerization zone 36. It is preferred that the isomerization be operated in a co-current mode of operation. Fixed bed, trickle bed down flow or fixed bed liquid filled up-flow modes are both suitable. See also, for example, US 2004/0230085. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials may include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48. ZSM-50, ZSM-57, MeAPO-11, MeAPO-31, MeAPO-41, MeAPSO-11, MeAPSO-31, MeAPSO-41, MeAPSO-46, ELAPO-I1, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. Nos. 5,510,306, 5,082,956, and 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449.

Isomerization conditions may include a temperature between 200 to 400° C. (392 to 752° F.) and a pressure between 1,724 kPa absolute (250 psia) to 5,516 kPa absolute (800 psia). In another embodiment the isomerization conditions include a temperature between 300 to 360° C. (572 to 680° F.) and a pressure between 3,102 kPa absolute (450 psia) to 3,792 kPa absolute (550 psia). Other operating conditions for the isomerization zone 36 are well known in the art.

The isomerized effluent 42 from the isomerization zone 36 may be passed to a separator vessel 44 to separate liquids and vapor, with the vapor being withdrawn in a line 46 and the liquid being withdrawn in a line 48. As the vapor in line 46 may comprise hydrogen and carbon monoxide, it may combined with the scrubbed recycle gas 32 (discussed above). Although it is depicted that the two recycle gas streams are combined, this is merely a preferred embodiment.

The liquid 48 from the separator vessel 44 can be passed to a separation zone 50 having one or more fractionation columns 52 to separate one or more transportation fuels streams 54 from an optional bottoms stream 56. Additionally, other streams may likewise be withdrawn from the fractionation columns 52, including for example, a naphtha stream, propane, butane, pentane, and LPG streams to name a few.

The transportation fuel stream 54 preferably comprises a side draw stream from the fractionation column 52 and in most preferred embodiment comprises a diesel boiling range fuel stream.

In order to further improve the flow properties of the diesel boiling range fuel stream, the transportation fuel stream 54 is passed to a filtration zone 58. The filtration zone 58 may comprise one or more vessels 60 each having a filter 62, such as a membrane or cartridge filter. In one exemplary design, the filtration zone 58 may have two vessels arranged in a lead-lag configuration (not shown). Other designs and arrangements are contemplated. Although not depicted as such, it is contemplated that the filtration zone 58 is disposed between the isomerization zone 36 and the separation zone 50.

The filter 62 includes a plurality of pores, having a nominal pore size configured to remove at least 70%, preferably at least 75%, of the particles having an average particle size between about 0.1 to 5 micrometers from the stream passed into the filtration zone 58. The average particle size may be determined via light scattering processes according to, for example, ASTM E2490 or ISO 13320. The filter 62 will remove one or more contaminants from the stream 54 and provide a filtered effluent 64. As demonstrated below, the filtered effluent 64 is believed to have improved flow properties, which may be combined in diesel blending pool with, for example, petroleum derived diesel range fuel. Alternatively, it is contemplated that the filter effluent 64 is used without blending with petroleum derived diesel range fuel.

Returning to the filtration zone 58, eventually the filter 62 may become clogged and, thus, would need to be flushed to be cleaned of contaminants. Accordingly, a wash stream 66 is passed, via a line, into the filtration zone 58, with the wash stream 66 preferably being heated in a heater 70 (or heat exchanger, or the like) so that the wash stream 66 has a temperature that is greater than a temperature of the filter 62 (before the wash stream 66 is used). In some embodiments, the wash stream comprises a portion of the isomerized effluent 42, such as, for example, a portion 54a of the diesel range stream in 54. Alternatively, the wash stream 66 may comprise a portion 64a of the filtered effluent 64. Other streams may be used as well. A spent wash stream 72 may be combined with the diesel range stream 54 (not shown) to recover desirable hydrocarbons that may have been used as the wash stream 66. Other processing of the spent wash stream 72 is not necessary for the practicing of the present invention.

In order to demonstrate the principles of the present invention, a sample of unfiltered green diesel fuel (produced generally in accordance with the above referenced description) was passed through a 1 μm Whatman™ Nuclepore™ Polycarbonate Track-Etched Membrane. The permeate was then passed through another filter and showed a 91.5% improvement in the filtration time compared to the unfiltered diesel fuel filtration time (difference between the two times/filtration time of unfiltered green diesel fuel). A sample of ULSD was also filtered and showed a 91.8% improvement in the filtration time compared to the unfiltered green diesel fuel. Thus, by filtering the green diesel fuel, the filtered green diesel fuel is very similar to commercially available petroleum based diesel fuel. As will be appreciated the ability to provide such a fuel is beneficial for end users as well as producers.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a process for improving a fuel flow property of bio based diesel fuel, the process comprising converting a biorenewable feedstock in a reaction zone having a catalyst and being operated under conditions to provide a hydrocarbon effluent; isomerizing the hydrocarbon effluent in an isomerization zone having an isomerization zone being operated at conditions to provide an isomerization effluent; filtering one or more contaminants from the isomerization effluent in a filtration zone having a filter configured to remove at least 70% of particles with an average particle size of between about 0.1 to 5 micrometers to provide a filtered effluent; and, separating at least a diesel range fuel stream from the filtered effluent. An embodiment of the invention is one, any or all of prior embodiments in this paragraph up through the first embodiment in this paragraph wherein the filter is configured to remove at least about 75% of the particles with an average particle size of between about 0.1 to 5 micrometers. An embodiment of the invention is one, any or all of prior embodiments in this paragraph up through the first embodiment in this paragraph further comprising flushing the filter of the filtration zone with a wash stream, the wash stream having a temperature that is higher than a temperature of the filter. An embodiment of the invention is one, any or all of prior embodiments in this paragraph up through the first embodiment in this paragraph wherein the wash stream comprises the isomerization effluent. An embodiment of the invention is one, any or all of prior embodiments in this paragraph up through the first embodiment in this paragraph wherein the wash stream comprises the filtered effluent. An embodiment of the invention is one, any or all of prior embodiments in this paragraph up through the first embodiment in this paragraph wherein the filtration zone comprises two vessels, each vessel including a filter with pores between about 0.1 to 5 micrometers. An embodiment of the invention is one, any or all of prior embodiments in this paragraph up through the first embodiment in this paragraph wherein the two vessels are arranged in a lead-lag configuration.

A second embodiment of the invention is a process for improving a fuel flow property of bio based diesel fuel, the process comprising passing a biorenewable feedstock to a reaction zone having a catalyst and being operated under conditions to provide a hydrocarbon effluent; passing at least a portion of the hydrocarbon effluent to a filtration zone having a filter configured to remove at least 70% of particles with an average particle size between about 0.1 to 5 micrometers to provide a filtered effluent; and, passing a wash stream into the filtration zone to regenerate the filter; and, passing the filtered effluent to a product separation zone configured to separate the components of the filtered effluent into at least a diesel range fuel stream. An embodiment of the invention is one, any or all of prior embodiments in this paragraph up through the second embodiment in this paragraph further comprising passing the hydrocarbon effluent to an isomerization zone having an isomerization zone being operated at conditions to provide an isomerization effluent; and, passing at least a portion of the isomerization effluent to the filtration zone. An embodiment of the invention is one, any or all of prior embodiments in this paragraph up through the second embodiment in this paragraph wherein the wash stream comprises the isomerization effluent. An embodiment of the invention is one, any or all of prior embodiments in this paragraph up through the second embodiment in this paragraph wherein the wash stream comprises the filtered effluent. An embodiment of the invention is one, any or all of prior embodiments in this paragraph up through the second embodiment in this paragraph wherein the wash stream comprises a portion of the hydrocarbon effluent. An embodiment of the invention is one, any or all of prior embodiments in this paragraph up through the second embodiment in this paragraph further comprising recycling at least a portion of a spent wash stream to the filtration zone with the portion of the hydrocarbon effluent. An embodiment of the invention is one, any or all of prior embodiments in this paragraph up through the second embodiment in this paragraph further comprising heating the wash stream to provide a heated wash stream; and, passing the heated wash stream to the filtration zone to regenerate the filter. An embodiment of the invention is one, any or all of prior embodiments in this paragraph up through the second embodiment in this paragraph further comprising blending the diesel range fuel stream with a petroleum derived diesel range fuel stream. An embodiment of the invention is one, any or all of prior embodiments in this paragraph up through the second embodiment in this paragraph wherein the filter is configured to remove at least 75% of particles with an average particle size of between about 0.1 to 5 micrometers. An embodiment of the invention is one, any or all of prior embodiments in this paragraph up through the second embodiment in this paragraph wherein the filtration zone is configured to remove at least one hydrocarbon based contaminant.

A third embodiment of the invention is an apparatus for producing a bio based diesel fuel, the apparatus comprising a deoxygenation zone having a catalyst and being operated under conditions to provide a hydrocarbon effluent; a filtration zone having a filter configured to remove at least 70% of particles with an average particle size of between about 0.1 to 5 micrometers to provide a filtered effluent, filtration zone in communication with the reaction zone; a wash stream line in communication with the filtration zone configured to supply wash stream to regenerate the filter; and, a product separation zone in communication with the filtration zone configured to separate the components of the filtered effluent into at least a diesel range fuel stream. An embodiment of the invention is one, any or all of prior embodiments in this paragraph up through the third embodiment in this paragraph further comprising an isomerization zone having an isomerization zone being operated at conditions to provide an isomerization effluent, the isomerization zone disposed between the deoxygenation zone and the filtration zone. An embodiment of the invention is one, any or all of prior embodiments in this paragraph up through the third embodiment in this paragraph further comprising a heater configured to heat the wash stream to provide heated wash stream to the filtration zone.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for producing diesel fuel, the process comprising:
    deoxygenating a biorenewable feedstock comprising triglycerides in a reaction zone having a catalyst and being operated under conditions to form linear paraffin chains and propane and provide a hydrocarbon effluent;
    isomerizing the hydrocarbon effluent in an isomerization zone having an isomerization catalyst, said isomerization zone being operated at conditions to provide an isomerization effluent;
    separating at least a diesel range fuel stream from the isomerization effluent; and
    filtering one or more particles from the diesel range fuel stream after the separation step or filtering one or more particles from the isomerization effluent before the separation step in a filtration zone having a filter configured to remove at least 70% of particles with an average particle size of between about 0.1 to 5 micrometers.

2. The process of claim 1 wherein the filter is configured to remove at least about 75% of the particles with an average particle size of between about 0.1 to 5 micrometers.

3. The process of claim 1 further comprising:
    flushing the filter of the filtration zone with a wash stream, the wash stream having a temperature that is higher than a temperature of the filter.

4. The process of claim 3 wherein the wash stream comprises the isomerization effluent used to backflush the filter.

5. The process of claim 3 wherein the wash stream comprises a filtered effluent.

6. The process of claim 1 wherein the filtration zone comprises two vessels, each vessel including a filter with pores between about 0.1 to 5 micrometers.

7. The process of claim 6 wherein the two vessels are arranged in a lead-lag configuration.

8. A process for producing diesel fuel, the process comprising:
    passing a biorenewable feedstock comprising triglycerides to a deoxygenation reaction zone having a catalyst and being operated under conditions to convert triglycerides to form linear paraffin chains and propane and provide a hydrocarbon effluent;
    separating the hydrocarbon effluent in a product separation zone configured to separate at least a diesel range fuel stream;
    passing the diesel range fuel stream after the separation step or at least a portion of the hydrocarbon effluent before the separation step to a filtration zone having a filter configured to remove at least 70% of particles with an average particle size between about 0.1 to 5 micrometers; and
    passing a wash stream into the filtration zone to regenerate the filter.

9. The process of claim 8 further comprising:
    passing the hydrocarbon effluent to an isomerization zone having an isomerization zone being operated at conditions to provide an isomerization effluent; and,
    passing at least a portion of the isomerization effluent to the filtration zone.

10. The process of claim 9 wherein the wash stream comprises the isomerization effluent used to backflush the filter.

11. The process of claim 8 wherein the wash stream comprises a filtered effluent.

12. The process of claim 8 wherein the wash stream comprises a portion of the hydrocarbon effluent.

13. The process of claim 12 further comprising:
    recycling at least a portion of a spent wash stream to the filtration zone with the portion of the hydrocarbon effluent.

14. The process of claim 8 further comprising:
    heating the wash stream to provide a heated wash stream; and,
    passing the heated wash stream to the filtration zone to regenerate the filter.

15. The process of claim 8 further comprising:
    blending the diesel range fuel stream with a petroleum derived diesel range fuel stream.

16. The process of claim 8 wherein the filter is configured to remove at least 75% of the particles with an average particle size of between about 0.1 to 5 micrometers.

17. The process of claim 8 further comprising passing at least a portion of the hydrocarbon effluent through a membrane and passing the permeate to the filtration zone.

\* \* \* \* \*